(12) United States Patent
Tachon et al.

(10) Patent No.: US 11,926,075 B2
(45) Date of Patent: Mar. 12, 2024

(54) CONVEYING SYSTEM AND COMPOUNDING SYSTEM COMPRISING THE SAME

(71) Applicant: TOYOTA MOTOR EUROPE, Brussels (BE)

(72) Inventors: Julien Tachon, Brussels (BE); Yusaku Onochi, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 760 days.

(21) Appl. No.: 17/043,794

(22) PCT Filed: Mar. 30, 2018

(86) PCT No.: PCT/EP2018/058351
§ 371 (c)(1),
(2) Date: Sep. 30, 2020

(87) PCT Pub. No.: WO2019/185169
PCT Pub. Date: Oct. 3, 2019

(65) Prior Publication Data
US 2021/0016467 A1 Jan. 21, 2021

(51) Int. Cl.
*B29B 7/90* (2006.01)
*B29C 31/02* (2006.01)
(Continued)

(52) U.S. Cl.
CPC ............... *B29B 7/90* (2013.01); *B29C 31/02* (2013.01); *B29B 7/60* (2013.01); *B29C 45/18* (2013.01); *B29K 2105/12* (2013.01)

(58) Field of Classification Search
CPC .. B29B 7/90; B29B 7/60; B29C 31/02; B29C 45/18; B29C 48/16; B29C 48/2886;
(Continued)

(56) References Cited

U.S. PATENT DOCUMENTS 3,003,189 A * 10/1961 Slayton ............... B29C 45/7626
425/436 RM
3,496,601 A * 2/1970 McGill ................. B29C 48/286
198/550.1

(Continued)

FOREIGN PATENT DOCUMENTS

CN 104870160 A 8/2015
DE 3600566 C1 7/1987
(Continued)

OTHER PUBLICATIONS

Dec. 10, 2018 International Search Report issued in International Patent Application No. PCT/EP2018/058351.
(Continued)

*Primary Examiner* — Donnell A Long
(74) *Attorney, Agent, or Firm* — Oliff PLC

(57) ABSTRACT

A conveying system including a conveying channel, a reinforcement feed duct connected to the conveying channel at a reinforcement feed opening and configured to feed a reinforcement material to the conveying channel, and a blower configured to provide a blow in the reinforcement feed duct to push the reinforcement material towards the conveying channel. A compounding system including the same.

12 Claims, 1 Drawing Sheet

(51) Int. Cl.
　　　*B29B 7/60*　　　(2006.01)
　　　*B29C 45/18*　　　(2006.01)
　　　*B29K 105/12*　　　(2006.01)

(58) Field of Classification Search
　　　CPC ................ B29C 31/10; B29K 2105/12; B29K 2105/06; B29K 2105/08
　　　See application file for complete search history.

(56) References Cited

U.S. PATENT DOCUMENTS

| | | | |
|---|---|---|---|
| 3,892,390 A * | 7/1975 | Eauclaire | B29C 48/29 366/156.1 |
| 2006/0037210 A1 | 2/2006 | Kawase | |
| 2013/0105526 A1 | 5/2013 | Ross et al. | |
| 2018/0099434 A1 * | 4/2018 | Okazaki | B29C 48/2886 |

FOREIGN PATENT DOCUMENTS

| | | |
|---|---|---|
| EP | 2 939 960 A1 | 11/2015 |
| EP | 2 979 837 A1 | 2/2016 |
| EP | 3 269 523 A1 | 1/2018 |
| FR | 2 529 824 A1 | 1/1984 |

OTHER PUBLICATIONS

Dec. 10, 2018 Written Opinion issued in International Patent Application No. PCT/EP2018/058351.

* cited by examiner

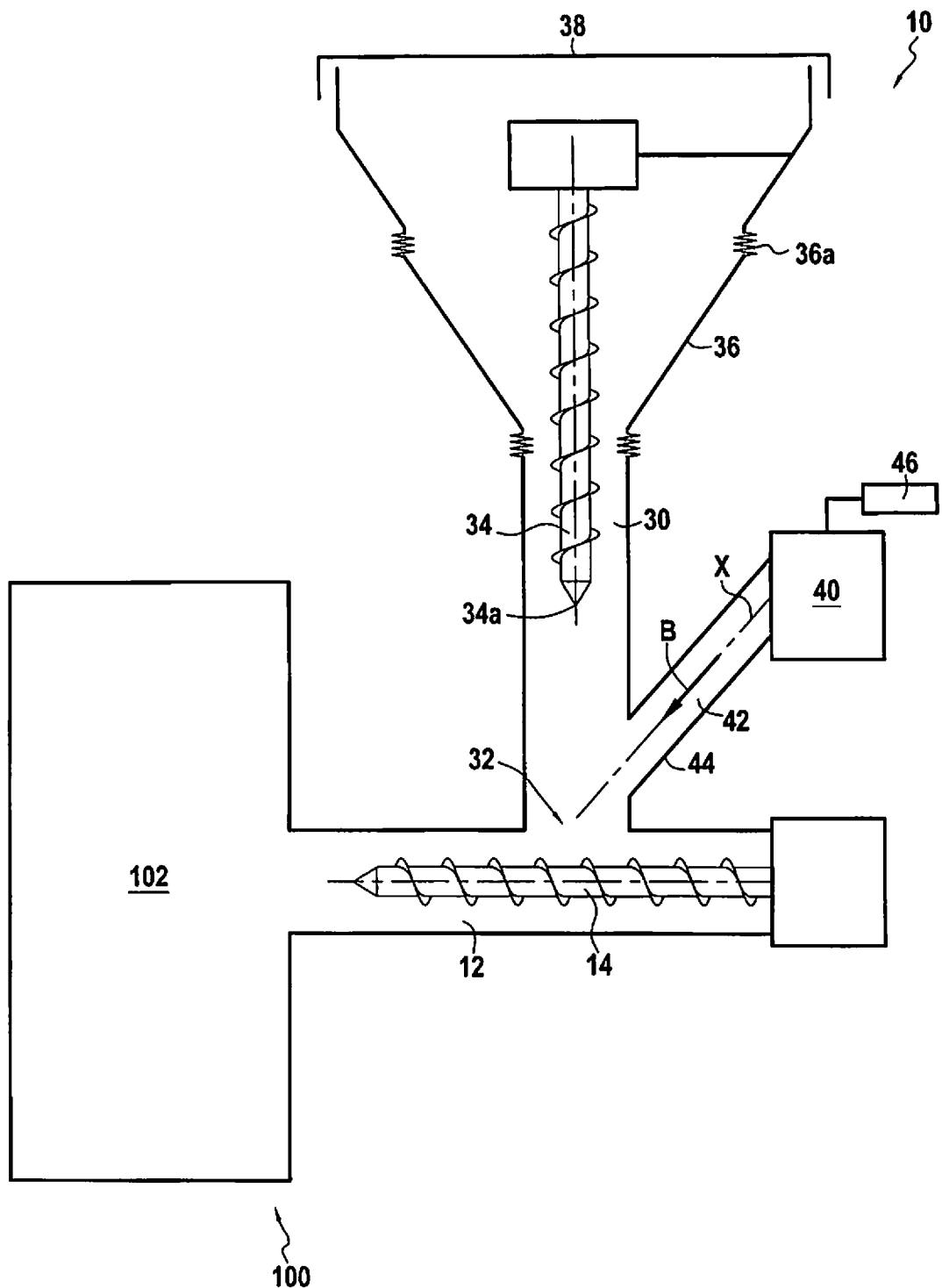

CONVEYING SYSTEM AND COMPOUNDING SYSTEM COMPRISING THE SAME

TECHNICAL FIELD

The present disclosure relates to the technical field of composite materials, and more particularly to an improved compounding system for producing a composite material comprising a matrix and reinforcement, and to an improved conveying system that can be used therein.

TECHNOLOGICAL BACKGROUND

Conveying systems are known, e.g. for conveying a reinforcement material to a compounding unit, for instance through a conveying channel. The compounding unit may mix the reinforcement material with a matrix material in order to obtain a composite material that may be used in many fields, including injection molding. However, the reinforcement material, such as fibers, tends to bridge and obstruct the reinforcement feed duct through which it is fed to the conveying channel. This results in an uneven reinforcement flow and a heterogeneous composition of the produced composite material.

Systems have been proposed to address this issue, but they add significant complexity and need additional parts which usually require maintenance and/or monitoring.

Therefore, there is a need for a simple conveying system addressing at least substantially the above drawbacks.

SUMMARY

In this respect, the present disclosure relates to a conveying system comprising a conveying channel, a reinforcement feed duct connected to the conveying channel at a reinforcement feed opening and configured to feed a reinforcement material to the conveying channel, and a blower configured to provide a blow in the reinforcement feed duct to push the reinforcement material towards the conveying channel.

In the present disclosure, unless otherwise stated, the words "upstream" and "downstream" are used with reference to the normal direction of transportation of the reinforcement material or the blow in the conveying system, depending on the context.

The blow is a flow of fluid, desirably gaseous, configured to push the reinforcement material towards the conveying channel. That is, the reinforcement material is driven from upstream. In other words, the blower is provided upstream of the blow. Therefore, the risk that part of the reinforcement material, which is carried along from upstream to downstream with the blow, reaches the blower, is significantly reduced. Therefore, the blower does not require a sophisticated protection against penetration of the reinforcement material. Further, an improved flowing quality and more homogeneous reinforcement rate can be obtained without significantly adding complexity to the conveying system.

The blow may be configured to push the reinforcement material to the conveying channel. The conveying system may be used as a reinforcement feeder, possibly a side feeder, for a compounding system. As a consequence of the above improvement, quality of the compounded product is increased.

In some embodiments, the blow is at a pressure greater than atmospheric pressure. In other words, the blow is not the result of a suction or vacuum pump, but an over-pressure provided in at least part of the reinforcement feed duct.

In some embodiments, the reinforcement material comprises fibers. The fibers may be discontinuous fibers, e.g. short or chopped fibers, preferably having a maximum dimension between 5 and 25 millimeters (mm). The fibers may be made of carbon or glass.

In some embodiments, the conveying system comprises a secondary duct connected to the reinforcement feed duct upstream of the reinforcement feed opening, the blower being arranged to provide the blow in the secondary duct. Thus, the blow is first provided in the secondary duct, flows down along the secondary duct and enters the reinforcement feed duct upstream of the reinforcement feed opening, so as to push the reinforcement material along the reinforcement feed duct towards the reinforcement feed opening and the conveying channel.

In some embodiments, the secondary duct has an outlet portion oriented towards the reinforcement feed opening. In these embodiments, the blow coming from the blower, along the secondary duct and through the outlet portion, is directed towards the reinforcement feed opening, so as to more effectively push the reinforcement material towards the conveying channel. For instance, a central axis of the outlet portion may pass through the reinforcement feed opening.

In some embodiments, the conveying system comprises a screw shaft extending in at least part of the reinforcement feed duct. The to screw shaft may participate in preventing obstruction of the reinforcement feed duct and/or conveying the reinforcement material towards the conveying channel.

In some embodiments, the conveying system comprises a screw shaft extending in part of the reinforcement feed duct, wherein a downstream end of the screw shaft is set upstream of the connection area between the secondary duct and the reinforcement feed duct. In these embodiments, the screw shaft does not interfere with the blow and the reinforcement material is more regularly pushed.

In some embodiments, the reinforcement feed duct comprises a vibrating portion configured to vibrate. The vibrating portion may further facilitate conveying the reinforcement material towards the conveying channel and limit obstruction of the reinforcement feed duct. As applicable, the vibrating portion may be provided upstream of the connection area between the secondary duct and the reinforcement feed duct and/or upstream of the screw shaft.

In some embodiments, the conveying system further comprises a cover configured to seal a hole for inserting the reinforcement material in the reinforcement feed duct. Therefore, in spite of the blow, the reinforcement material is prevented from being blown out of the reinforcement feed duct, thereby preserving operators' health and avoiding possible shortcuts in case the reinforcement material is conductive. The sealing obtained thanks to the cover may be tight enough to prevent backflow of the reinforcement material.

In some embodiments, the reinforcement feed duct has a narrowing. The dimension of the narrowing may help controlling the reinforcement feed rate.

In some embodiments, the conveying system comprises a control unit configured to control the blow flow rate. The control unit may be configured to control a blowing power of the blower. The blow flow rate may be adapted to any of the composition or shape of the reinforcement material, the feed rate of the reinforcement material, etc., in order to provide a desired amount of reinforcement material into the conveying channel.

The present disclosure also relates to a compounding system, comprising the conveying system as previously described and a compounding unit, the conveying system being configured to convey the reinforcement material for compounding with a matrix material in the compounding unit. The compounding system may be integrated in an injection molding machine or be a side system operatively connected to the rest of an injection molding machine.

The present disclosure also relates to a composite material produced by the compounding system as previously described, comprising reinforcement embedded in a matrix. Such a composite material has a homogeneous distribution of reinforcement in the matrix.

BRIEF DESCRIPTION OF THE DRAWINGS

The invention and advantages thereof will be better understood upon reading the detailed description which follows, of embodiments given as non-limiting examples. This description refers to the appended drawings, wherein the sole FIGURE is a diagrammatic side view of a compounding system comprising a conveying system according to an embodiment.

DETAILED DESCRIPTION OF EMBODIMENTS

A compounding system 100 according to an embodiment is diagrammatically represented in the FIGURE. The compounding system 100 comprises a compounding unit 102 and a conveying system 10. The conveying system 10 is configured to convey reinforcement material for compounding with a matrix material in the compounding unit 102. For this purpose, as illustrated, an outlet of the conveying system 10 may be connected to at least one feed port of the compounding unit 102.

The compounding unit 102 may be of a type known per se. In the compounding unit 102, the matrix material and the reinforcement material are mixed and compounded to form the above-mentioned composite material. The compounding unit 102 may be configured to provide the composite material in the form of pellets, e.g. through an extruder. The matrix material may comprise a polymer, e.g. a polymeric resin. The resin may be thermoplastic or thermosetting. For instance, the matrix material may be polypropylene.

The conveying system 10 comprises a conveying channel 12. The conveying channel 12 may comprise at least one conveying element 14 in order to facilitate conveying of the reinforcement material. In this embodiment, the at least one conveying element 14 comprises a screw shaft (hereafter "screw shaft 14"). There may be provided one or more screw shafts 14, possibly counter-rotating. The screw shaft 14 conveys the reinforcement material towards the outlet of the conveying channel 12. Other conveying elements 14 may be provided in addition or as an alternative to the screw shaft.

The conveying system 10 further comprises a reinforcement feed duct 30 connected to the conveying channel 12 at a reinforcement feed opening 32. The reinforcement feed opening 32 is the limit between the reinforcement feed duct 30 and the conveying channel 12. In this embodiment, the conveying channel 12 and the reinforcement feed duct 30 make a bend with each other, however other shapes or orientations may be contemplated, e.g. a rectilinear shape.

The reinforcement material may comprise fibers. In this embodiment, the reinforcement material comprises carbon short fibers, possibly chopped fibers.

The conveying system 10 may further comprise a screw shaft 34 extending in at least part of the reinforcement feed duct 30. The screw shaft 34 not only transports the reinforcement material along the reinforcement feed duct 30, but also participate in preventing bridging of the reinforcement material, e.g. fibers, in the corresponding section of the reinforcement feed duct 30.

The screw shaft 34 may be similar to or different from the screw shaft 14 of the conveying channel 12. The screw shaft 34 may be held in the reinforcement feed duct 30 e.g. by a support fastened to a stationary portion of the conveying system 10, for instance to an upstream portion of the reinforcement feed duct 30. Any one of the screw shafts 14, 34, may have its rotating speed regulated.

Additionally or alternatively, the reinforcement feed duct 30 may comprise a vibrating portion 36 configured to vibrate. The vibrating portion 36 may be connected to the remaining part of the reinforcement feed duct 30 by a soft and/or resilient material, e.g. annular joints 36a. In this embodiment, the vibrating portion 36 is provided as a hopper.

The vibrating portion 36 may be actuated to vibrate by a non-illustrated actuator known per se. It is desirable that the actuator be located outside of the reinforcement feed duct 30 to protect it from the reinforcement material and simplify maintenance.

By vibrating, the vibrating portion 36 may not only facilitate, by gravity, the flow of reinforcement material along the reinforcement feed duct 30, but also participate in preventing bridging of the reinforcement material, e.g. fibers, in the vibrating portion 36.

In this embodiment, as illustrated in the FIGURE, the reinforcement feed duct 30 has a narrowing. That is, the cross-section of the reinforcement feed duct 30 decreases from upstream to downstream, i.e. towards the conveying channel 12. In this embodiment, the narrowing includes the vibrating portion 36. In this respect, the vibrating portion 36 may have a substantially frustoconical shape. Additionally or alternatively, the narrowing may include another portion of the reinforcement feed duct 30, for instance, as illustrated, a portion of the reinforcement feed duct 30 upstream of the vibrating portion 36.

Downstream of the narrowing, and/or downstream of the vibrating portion 36, the reinforcement feed duct 30 may be substantially cylindrical, e.g. with a substantially circular cross-section.

The most upstream portion of the reinforcement feed duct 30 defines a hole which can be used for inserting the reinforcement material in the reinforcement feed duct 30. In other embodiments, the hole may be provided on a side of the reinforcement feed duct 30. In order to avoid blasting the reinforcement material during operation of the conveying system 10, notably due to the blow described below, the hole for inserting the reinforcement material may be sealed by a cover 38.

The cover 38 may have an elastic seal on its surrounding, e.g. made of rubber, and/or some clamps to attach it to the vibrating portion 36.

The cover 38 may be removable, so that the reinforcement feed duct 30 can be loaded with the reinforcement material. For instance, the loading may be organized in batches, the cover 38 being installed again to seal the insertion hole between two successive loadings or batches. In spite of the sequential batch loading, the screw shaft 34, the vibrating portion 36 and/or other appropriate components enable continuous feeding of the reinforcement material to the conveying channel 12.

As shown in the FIGURE, in this embodiment, a downstream end 34a of the screw shaft 34 is located upstream of the reinforcement feed opening 32. As a consequence, a sufficient reinforcement feed rate is possible through the reinforcement feed opening 32. In order to prevent the formation of reinforcement bridges between the end 34a and the reinforcement feed opening 32, and more generally in order to prevent the formation of bridges in the reinforcement feed duct 30, the conveying system 10 comprises a blower 40. The blower 40 is configured to provide a blow B in the reinforcement feed duct 30 to push the reinforcement material towards the conveying channel 12.

The blower 40 may be a compressor, a pump or the like, which is configured to pressurize a fluid, typically a gas such as air, and to project it in the reinforcement feed duct 30 in order to exert a pressure on the reinforcement material and break possible bridges which would start forming. In other words, the blower 40 is configured to provide the blow B at a pressure greater than atmospheric pressure, thereby triggering a fluid flow within the reinforcement feed duct 30 and reducing stagnation of the reinforcement material. As a result, obstruction of the reinforcement feed duct 30 is limited.

A vent may be provided in the conveying system 10 in order to limit overpressure caused by the blower 40. For instance, a hole may be provided in the cover 38, e.g. in a central portion thereof. The vent may be provided with a filtering device to avoid blowing the fibers out of the conveying system 10.

As mentioned previously, the conveying system 10 may comprise a secondary duct 42 connected to the reinforcement feed duct 30 upstream of the reinforcement feed opening 32, the blower 40 being arranged to provide the blow B in the secondary duct 42. As shown in the FIGURE, the blower 40 may have an outlet portion 44 connected to the secondary duct 42. The blow B flows along the secondary duct 40 and enters the reinforcement feed duct 30 upstream of the reinforcement feed opening 32.

In order to efficiently direct at least most of the blow B to the reinforcement feed opening 32, the outlet portion 44 of the secondary duct 40 may be oriented towards the reinforcement feed opening 32. The outlet portion 44 may be the portion of the secondary duct 40 that is directly connected to the reinforcement feed duct 30. For instance, a central axis X of the outlet portion 44 may pass through the reinforcement feed opening 32. Note that in this case, the secondary duct 42 is substantially rectilinear, but it may not be so. The central axis X may not be rectilinear as well and may be curved, in accordance with the shape of the secondary duct 42. More generally, it is desirable that an imaginary straight line extending the central axis X of the outlet portion 44 passes through the reinforcement feed opening 32. As shown, the secondary duct 42 and the reinforcement feed duct 30 may form an angle less than 90°.

In this embodiment, in order not to disturb the blow B leaving the outlet portion 44 and entering the reinforcement feed duct 30, the downstream end 34a of the screw shaft 34 may be set upstream, in the reinforcement feeding direction, of the connection area between the secondary duct 42 and the reinforcement feed duct 30, as illustrated in the FIGURE. In other embodiments, the connection area between the secondary duct 42 and the reinforcement feed duct 30 could be provided more upstream, including upstream of the vibrating portion 36 if any, although this could require a more powerful blow B.

The conveying system 10 may further comprise a control unit 46 configured to control the flow rate of the blow B, i.e. the blowing power of the blower 40. For instance, depending on the reinforcement density, size, composition and the like, the flow rate of the blow B may be adjusted to provide a flow which is powerful enough to prevent or break bridges and soft enough to keep the reinforcement feed flow regular.

The conveying system 10 may be used as explained above to feed a reinforcement material to the compounding system 100, in order to produce the composite material which, as a result, comprises the reinforcement embedded in the matrix.

Although the present disclosure refers to specific exemplary embodiments, modifications may be provided to these examples without the departing from the general scope of the invention as defined by the claims. In particular, individual characteristics of the different illustrated/mentioned embodiments may be combined in additional zo embodiments. Therefore, the description and the drawings should be considered in an illustrative rather than in a restrictive sense.

The invention claimed is:

1. A compounding system comprising a conveying system and a compounding unit, the conveying system comprising:
    a conveying channel,
    a reinforcement feed duct connected to the conveying channel at a reinforcement feed opening and configured to feed a reinforcement material to the conveying channel,
    a secondary duct connected to the reinforcement feed duct upstream of the reinforcement feed opening, and
    a blower configured to provide a blow in the reinforcement feed duct to push the reinforcement material towards the conveying channel,
    wherein the blower being arranged to provide the blow in the secondary duct,
    the conveying system being configured to convey the reinforcement material for compounding with a matrix material in the compounding unit, and
    the conveying channel comprises at least one conveying element in order to facilitate conveying of the reinforcement material.

2. The compounding system as claimed in claim 1, wherein the blow is at a pressure greater than atmospheric pressure.

3. The compounding system as claimed in claim 1, wherein the reinforcement material comprises fibers.

4. The compounding system as claimed in claim 1, wherein the secondary duct has an outlet portion oriented towards the reinforcement feed opening.

5. The compounding system as claimed in claim 1, wherein the conveying system comprises a screw shaft extending in at least part of the reinforcement feed duct.

6. The compounding system as claimed in claim 1, wherein the conveying system comprises a screw shaft extending in part of the reinforcement feed duct, wherein a downstream end of the screw shaft is set upstream of the connection area between the secondary duct and the reinforcement feed duct.

7. The compounding system as claimed in claim 1, wherein the reinforcement feed duct comprises a vibrating portion configured to vibrate.

8. The compounding system as claimed in claim 1, wherein the conveying system further comprises a cover configured to seal a hole for inserting the reinforcement material in the reinforcement feed duct.

9. The compounding system as claimed in claim 1, wherein the reinforcement feed duct has a narrowing.

10. The compounding system as claimed in claim 1, wherein the conveying system comprises a control unit configured to control the blow flow rate.

11. A composite material produced by the compounding system as claimed in claim 1, comprising reinforcement embedded in a matrix.

12. A conveying system comprising:
- a conveying channel comprising at least one first screw shaft in order to facilitate conveying of a reinforcement material;
- a reinforcement feed duct connected to the conveying channel at a reinforcement feed opening and configured to feed the reinforcement material to the conveying channel;
- a blower configured to provide a blow in the reinforcement feed duct to push the reinforcement material towards the conveying channel;
- a secondary duct connected to the reinforcement feed duct upstream of the reinforcement feed opening, the blower being arranged to provide the blow in the secondary duct, wherein the secondary duct has an outlet portion oriented towards the reinforcement feed opening, and wherein a central axis of the outlet portion passes through the reinforcement feed opening; and
- a cover configured to seal a hole for inserting the reinforcement material in the reinforcement feed duct, wherein the cover is removable, so that the reinforcement feed duct can be loaded with the reinforcement material, and wherein the cover is provided with a vent in order to limit overpressure caused by the blower.

* * * * *